United States Patent [19]
Murray et al.

[11] Patent Number: 5,592,982
[45] Date of Patent: Jan. 14, 1997

[54] STABILIZING CLAMP FOR CANOPY OF A RETRACTABLE AWNING

[75] Inventors: Brent W. Murray, Longmont; Thomas G. Faludy, Westminster, both of Colo.

[73] Assignee: Carefree/Scott Fetzer Company, Broomfield, Colo.

[21] Appl. No.: 613,228

[22] Filed: Mar. 8, 1996

[51] Int. Cl.$^6$ ............................................. E04F 10/06
[52] U.S. Cl. ............................... 160/67; 135/88.12
[58] Field of Search ........................ 160/67, 66, 69, 160/70, 71, 78, 79, 80, 22, 45, 268.1; 135/88.11, 88.12; 24/335, 369, 525, 527; 248/316.1, 316.5, 229.13, 229.23

[56] References Cited

U.S. PATENT DOCUMENTS

| 1,011,495 | 12/1911 | Rupert | 160/268.1 |
| 1,216,594 | 2/1917 | Murray | 160/268.1 |
| 2,473,305 | 6/1949 | Schmaus | 160/268.1 |
| 5,314,153 | 5/1994 | White . | |
| 5,369,850 | 12/1994 | Noble . | |

OTHER PUBLICATIONS

Advertisement from Camping World Best Sellers, Feb. 1994, pp. 10 and 14, illustrating various awning clamps.

*Primary Examiner*—David M. Purol
*Attorney, Agent, or Firm*—Gary M. Polumbus

[57] ABSTRACT

A stabilizing clamp for securing a retractable awning canopy to an adjacent rafter arm is pivotally mounted on the rafter arm and moveable between a non-use position in alignment with the arm and an extended perpendicular position wherein a pair of clamping jaws releasably grip the side edge of the awning canopy. The clamp is of very low profile so as to not interfere with movement of the awning into a retracted position adjacent a support surface.

10 Claims, 5 Drawing Sheets

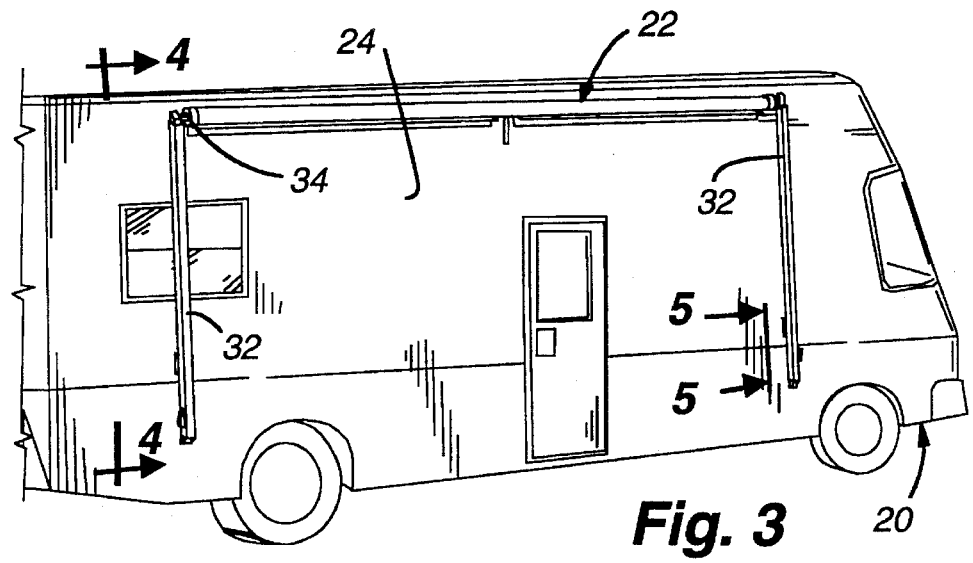
Fig. 3
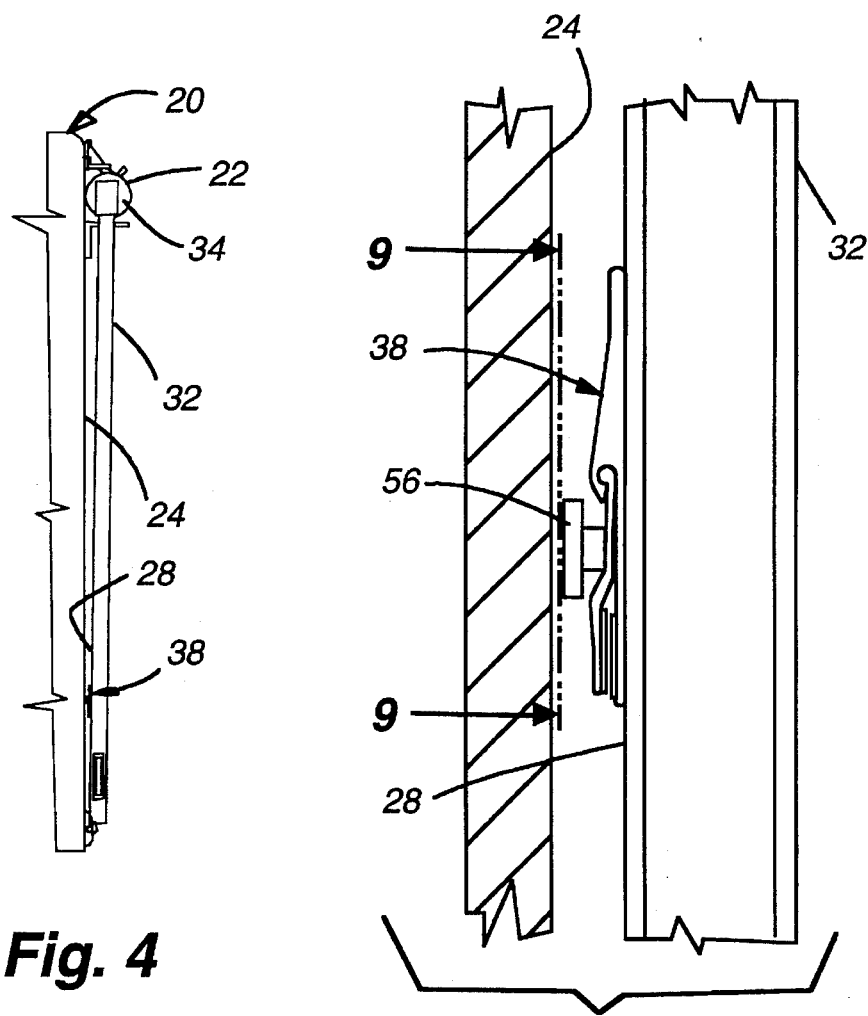
Fig. 4
Fig. 5

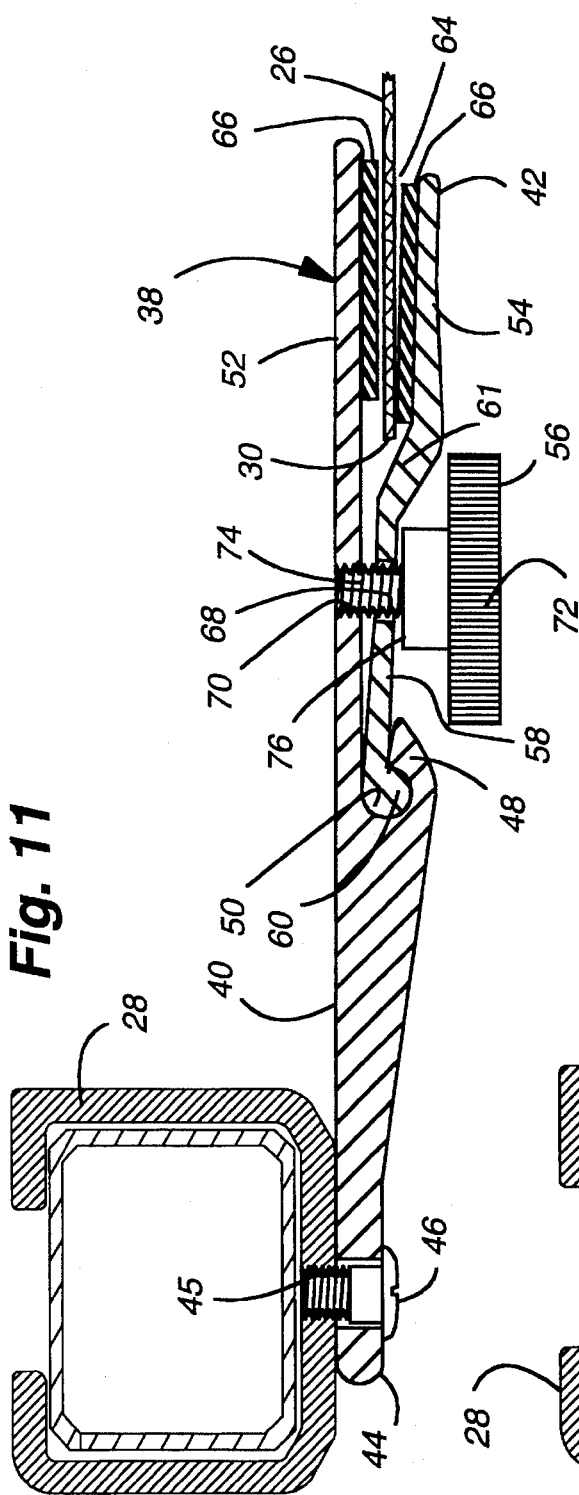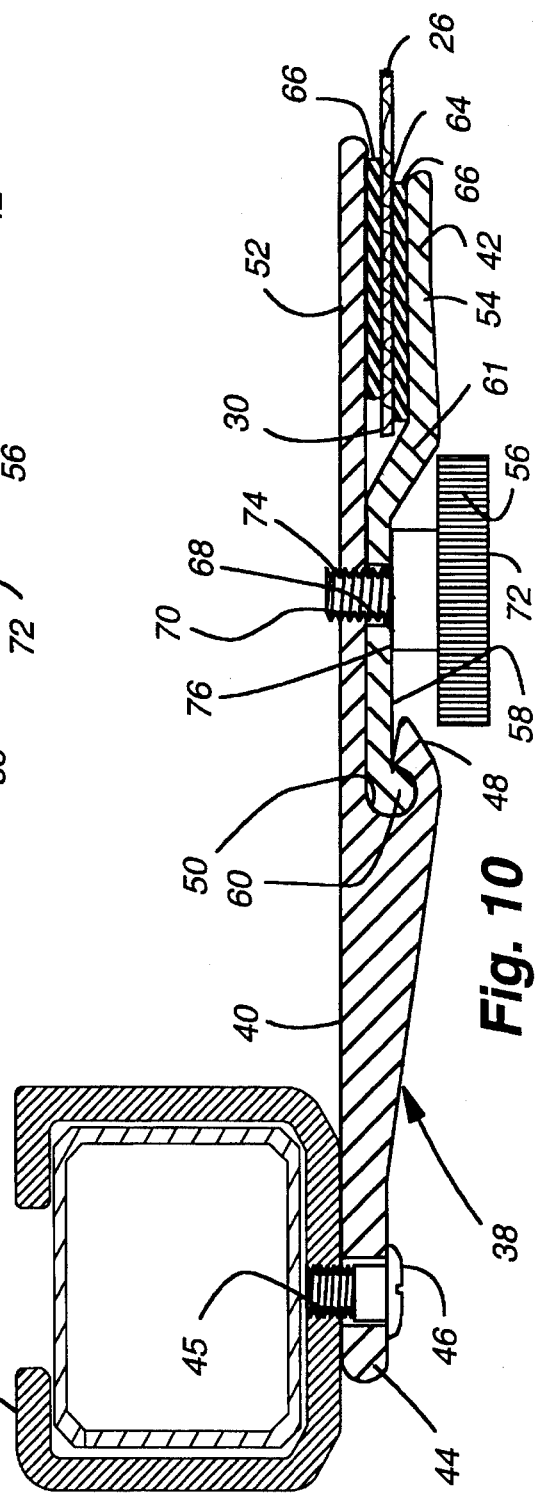

5,592,982

STABILIZING CLAMP FOR CANOPY OF A RETRACTABLE AWNING

BACKGROUND OF THE INVENTION

1. Field of the Invention

The present invention relates generally to retractable awnings and more particularly to a stabilizing clamp adapted to minimize flapping of the awning canopy during inclement weather.

2. Description of the Prior Art

Retractable awnings have been utilized for many years to provide shade or other protection to doorways, windows or to overlie an area adjacent to a building structure such as a patio, deck, or the like. More recently, retractable awnings have been mounted on movable structures such as travel trailers, mobile homes, recreational vehicles and the like.

In any of the above uses, however, a prevalent problem has been damage to the canopy of the awning caused when inclement weather conditions, such as high winds, cause the canopy to flap thereby tearing or in some cases stretching the canopy fabric.

Most, if not all, retractable awnings include rafter arms which extend from a support surface for the awning to the outer edge of the awning canopy when the awning is extended. Systems have been developed for preventing damage to awning canopies which include clamps that connect the canopy to the rafter arms along the side edges of the canopy. These clamps are typically characterized by being removable and by a pair of jaws that encompass both the adjacent rafter arm and the awning canopy so as to simultaneously grip the rafter arm and the canopy thereby securing the canopy to the rafter arm to minimize flapping or other movement of the canopy. When removed from the rafter arm, however, the clamps must be stored at a remote location and, therefore, are frequently lost or at a minimum become a nuisance.

The present invention has been developed to provide a new and improved system for minimizing damage to the canopies of retractable awnings in a manner which overcomes the shortcomings of prior art systems.

SUMMARY OF THE INVENTION

The stabilizing clamp of the present invention has been designed to be incorporated onto the rafter arm conventionally found on retractable awnings in a manner such that it is movable between a use position and a non-use position. In the use position, the clamp is adapted to grip the canopy of the retractable awning along a side edge of the canopy to immobilize the canopy relative to the rafter arm at that location thereby preventing the canopy from flapping in inclement weather conditions. In the non-use position, the clamp remains affixed to the rafter arm and has a very low profile so that the rafter arm can be positioned adjacent the support surface of the awning when the awning is retracted in a conventional manner.

The clamp includes a base that is pivotally connected to an associated rafter arm so as to be movable between the use and non-use positions. The base includes a clip at one end that is formed from a pair of clamping jaws that are selectively and alternately movable between open and closed conditions. In the closed condition, the canopy is gripped between the jaws thereby immobilizing the canopy relative to the rafter arm to which the clamp is secured.

A thumb screw selectively permits movement of the jaws between the open and closed positions and further serves to secure the clamp in the non-use position by a releasable connection to the rafter arm.

Other aspects, features and details of the present invention can be more completely understood by reference to the following detailed description of a preferred embodiment, taken in conjunction with the drawings and from the appended claims.

BRIEF DESCRIPTION OF THE DRAWINGS

FIG. 3 is a fragmentary isometric similar to FIG. 1 with the awning in a retracted position and the clamp in a non-use position.

FIG. 4 is a fragmentary enlarged fragmentary section taken along line 4—4 of FIG. 3.

FIG. 5 is an enlarged fragmentary section taken along line 5—5 of FIG. 3.

FIG. 10 is a section taken along line 10—10 of FIG. 8 showing the clamp in a closed position.

FIG. 11 is a section similar to FIG. 10 showing the clamp in a separated position.

DESCRIPTION OF THE PREFERRED EMBODIMENT

Figure 1:
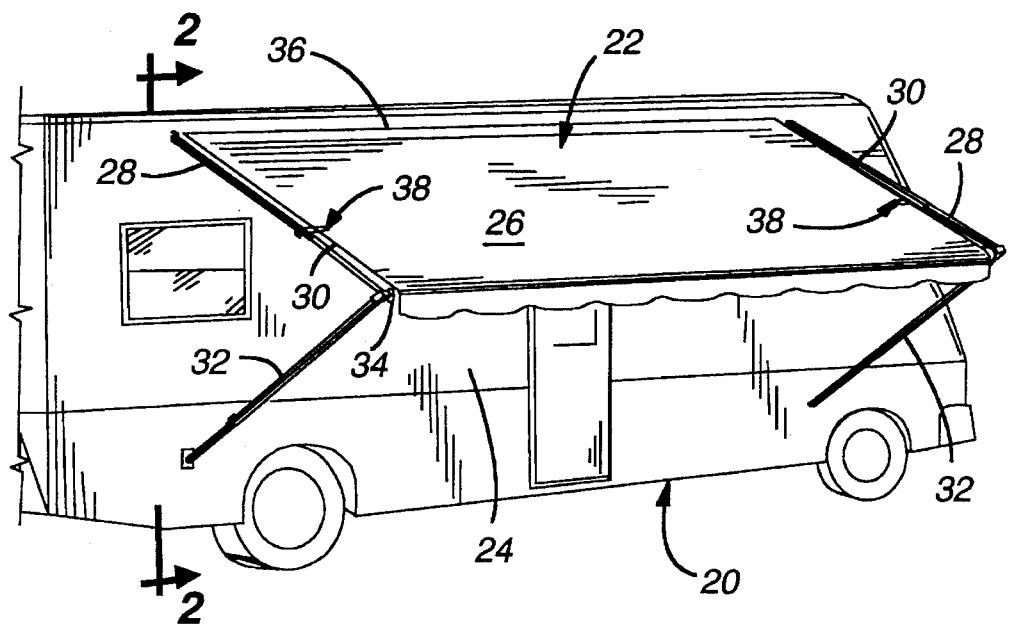
FIG. 1 is a fragmentary isometric view of a recreational vehicle having a retractable awning thereon in an extended position with a pair of clamps of the present invention being operative in a use position to stabilize the canopy.
Figure 2:
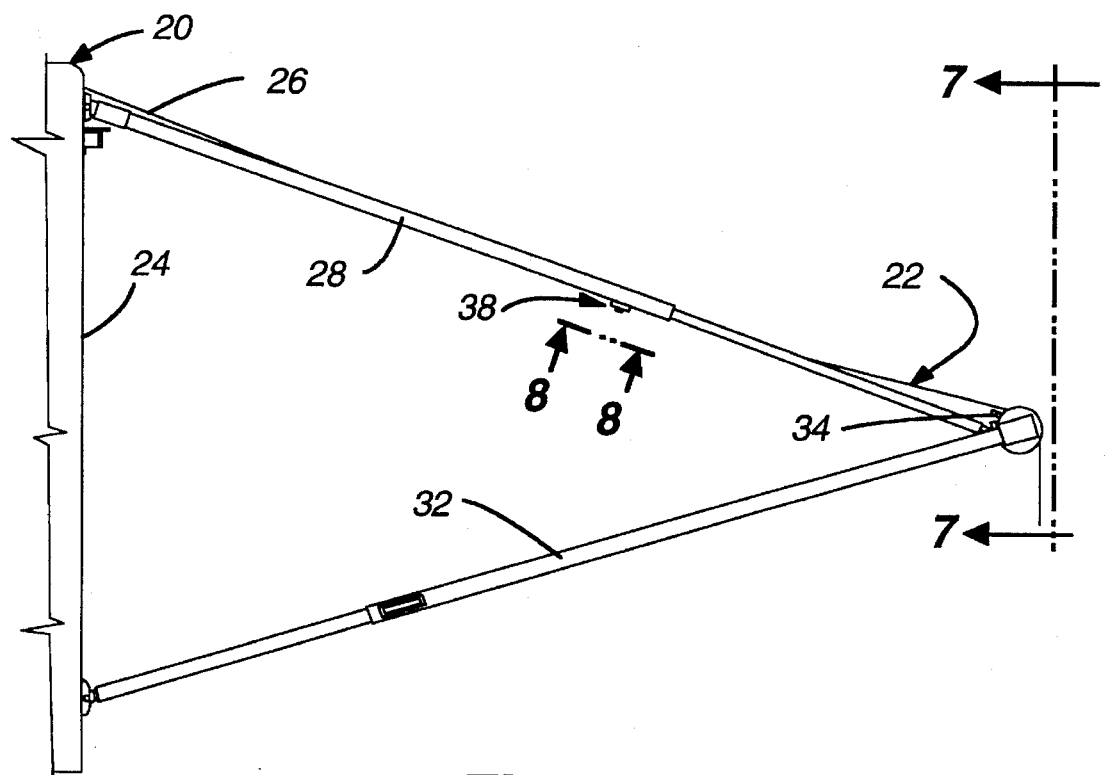
FIG. 2 is a fragmentary section taken along line 2—2 of FIG. 1.

FIG. 1 shows a recreational vehicle 20 having a retractable awning 22 mounted on the side 24 thereof with the awning being in an extended position. The awning is movable between the extended position of FIG. 1 and a retracted position as shown in FIG. 3. The awning includes an awning canopy 26, a pair of rafter arms 28 extending along opposite side edges 30 of the canopy, a pair of support arms 32 associated with the rafter arms 28 and a roll bar 34 at the outer edge of the awning canopy about which the canopy is wrapped when moved to the retracted position of FIG. 3. The canopy 26 has an inner edge 36 secured in any conventional manner to the side 24 of the recreational vehicle, with an inner end of the rafter arms and the support arms also being securable to the support surface.

Outer ends of the support arms and rafter arms operatively and rotatively support the roll bar 34 so that upon movement of the roll bar away from the side 24 of the vehicle, the rafter arms and support arms can be extended and locked in a predetermined position to retain the awning canopy in the extended position of FIG. 1. The rafter arms and support arms are telescopically collapsible adjacent to the sides of the vehicle, or the support surface, as illustrated in FIGS. 3 through 5 when the awning is retracted. As will be appreciated in FIG. 4, when in the retracted position, the rafter arms 28 are positioned very close and in substantially parallel relationship with the side of the recreational vehicle with the spacing between the rafter arms and the side of the recreational vehicle being approximately one inch. This will be important to an understanding of the benefits of the clamp 38 of the present invention as will become more clear with the description of the clamp hereafter.

Figure 6:
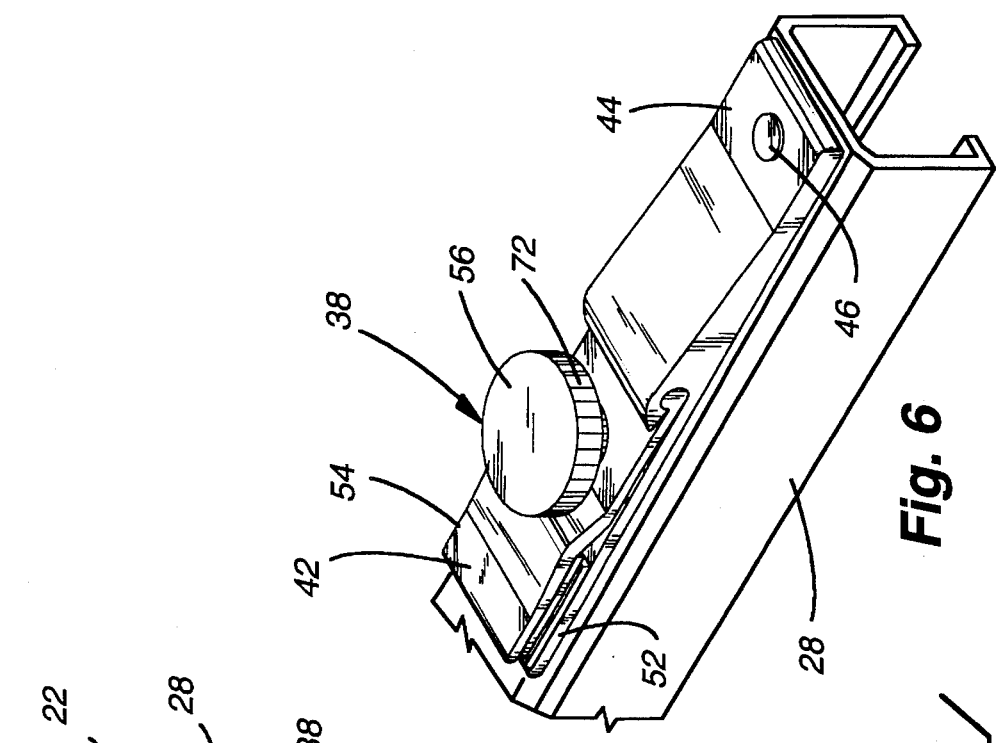
FIG. 6 is a fragmentary isometric showing the connection of the stabilizing clamp of the present invention with a rafter arm.
Figure 7:
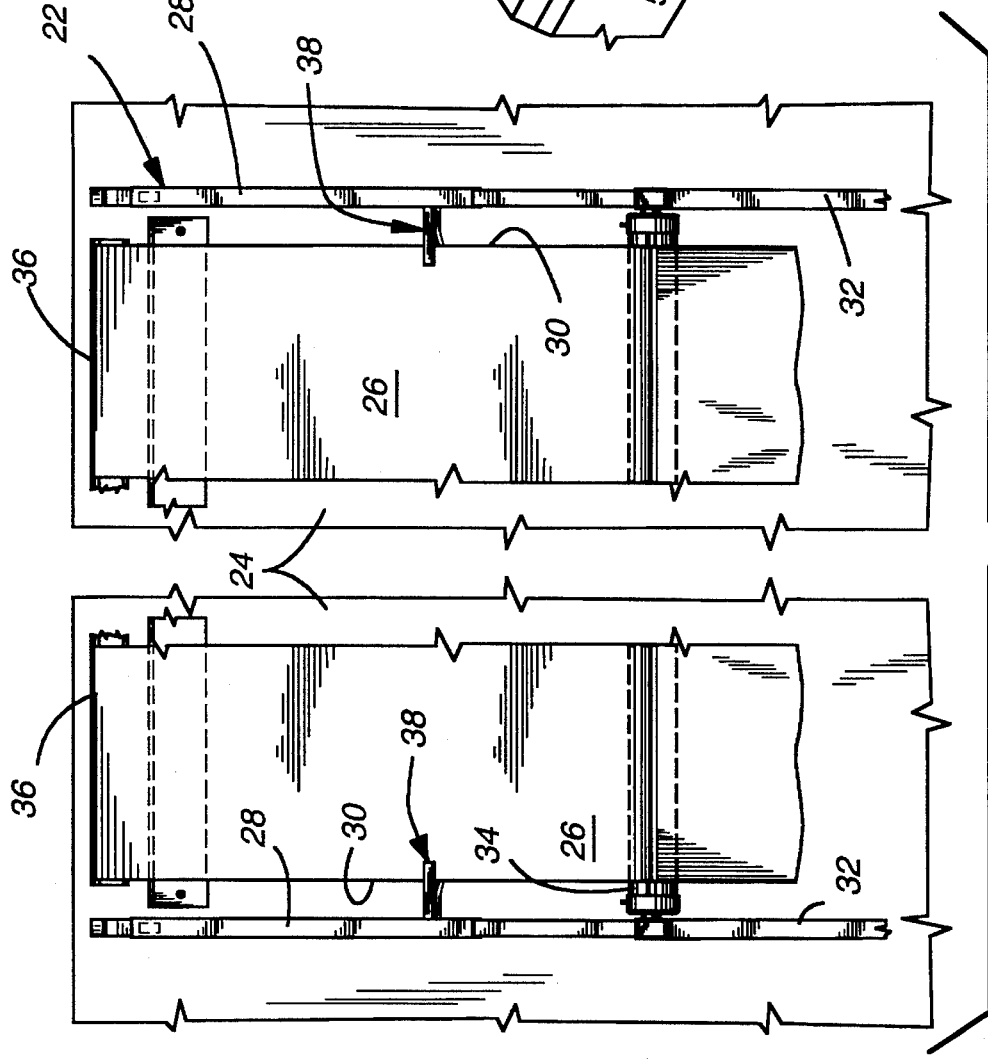
FIG. 7 is an enlarged fragmentary plan view as seen from line 7—7 of FIG. 2.
Figure 9:
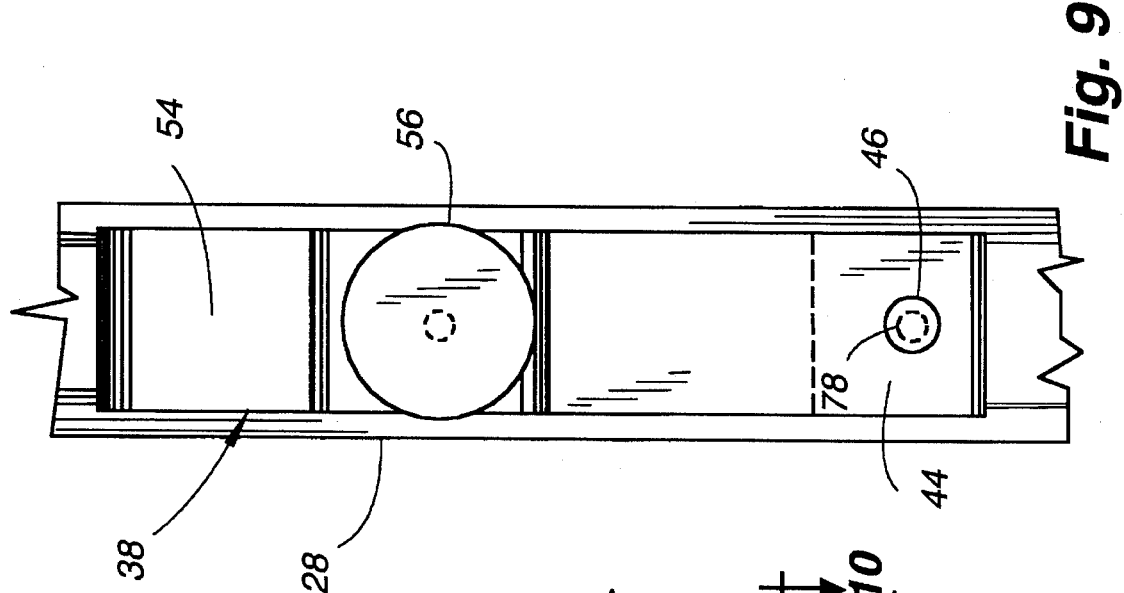
FIG. 9 is an enlarged fragmentary section taken along line 9—9 of FIG. 5.
Figure 8:
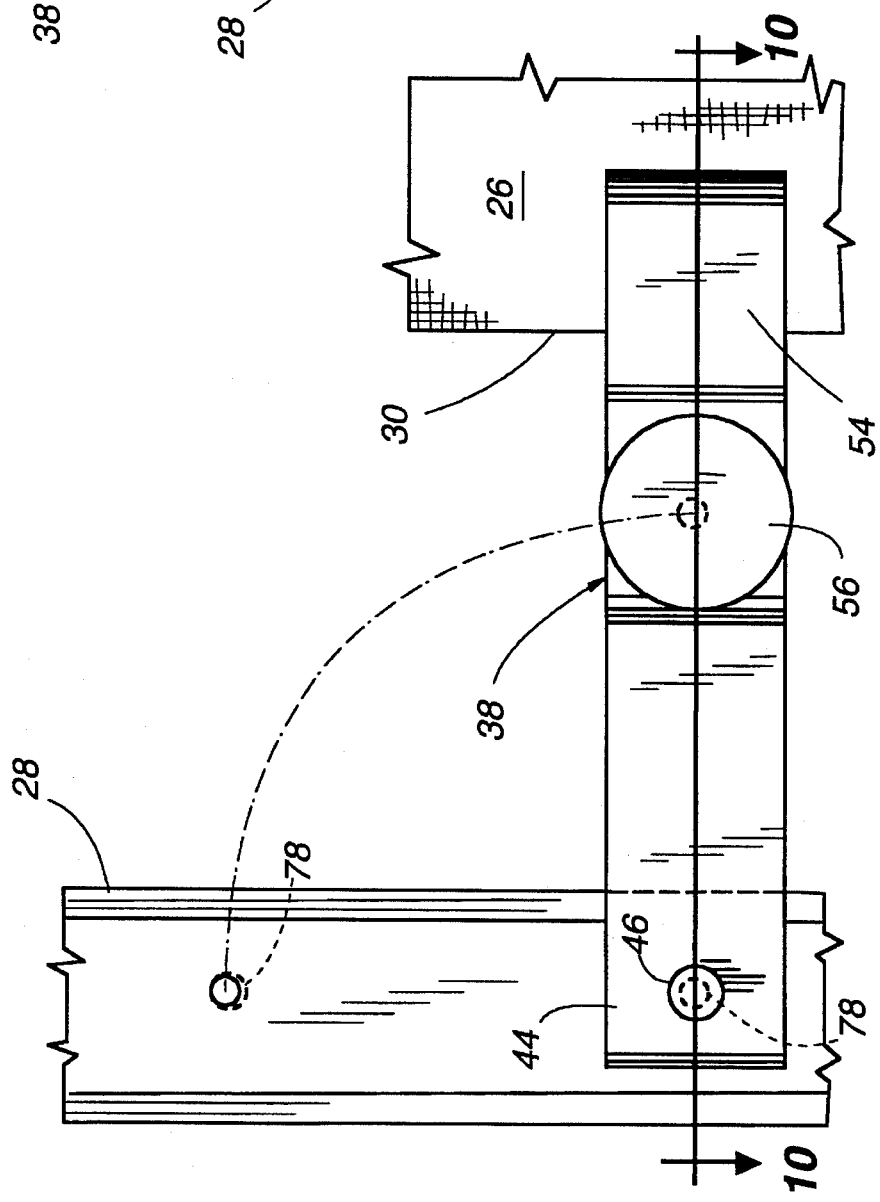
FIG. 8 is an enlarged fragmentary section taken along line 8—8 of FIG. 2 showing in phantom line the line of movement of the clamp between use and non-use positions.

The clamp 38 of the present invention, as can be seen in FIG. 1, is secured to at least one rafter arm 28 and adapted to grip a side edge 30 of the awning canopy 26 so as to substantially immobilize the canopy relative to the rafter arm at the location of connection. The clamp is possibly best seen in FIG. 6 to comprise an elongated base 40 that includes a clip portion 42 at one end and a solid portion 44 at the opposite end. The solid portion 44 of the base is pivotally connected to the associated rafter arm 28, in a threaded hole 5, with a pivot pin 46 which allows the base to pivot about the pin between use and non-use positions as illustrated in FIGS. 8 and 6 respectively. As will be appreciated, in the non-use position, the base 40 is aligned with the rafter arm so as to extend in contiguous parallel relationship therewith while in the use position, the base extends perpendicularly to the rafter arm so as to interface with the side edge 30 of the awning canopy.

The pivot pin 46 can be any suitable pivot such as a rivet or other similar fastener that secures the base to the rafter arm while allowing the aforenoted pivotal movement. As possibly best seen in FIG. 10, the solid portion 44 of the base is increasingly thickened toward the longitudinal center of the base and has a hook shaped arm 48 defining a pivot recess 50 for a purpose to be described later.

The clip portion 42 of the base 40 is comprised of a fixed element 52, which is a flat integral extension from the solid portion 44 of the base, a pivotal element or jaw member 54 which is pivotally received along one edge in the pivot recess 50 and an adjustment controller in the form of a thumb screw 56 operatively interconnecting the fixed element 52 to the pivotal element 54. The pivotal element, or jaw member 54 is substantially z-shaped in cross section defining a trailing segment 58 that includes an elongated bead 60 which is received in the pivot recess 50, an inclined intermediate segment 61 and a leading segment 62 parallel with the trailing segment 58. The leading segment is spaced from the fixed element or jaw member 52 thereby defining a slot or recess 64 into which the side edge 30 of the awning canopy can be extended. The lower face of the leading segment 62 and the upper face of the fixed jaw member 52 each have resilient pads 66 secured thereon which are adapted to provide a positive grip on the awning canopy when the clip portion 42 is closed to thereby secure the side edge of the canopy.

The trailing segment 58 of the pivotal jaw member 54 has a cylindrical, unthreaded opening 68 therethrough which is aligned with a threaded cylindrical opening 70 through the fixed jaw member 52. The thumb screw 56 has a disk shaped gripping head 72 that is knurled around its periphery and a threaded shaft 74 that is slidably received in the opening 68 through the pivotal jaw member and threadedly received in the opening 70 in the fixed jaw member. The threaded shaft protrudes from a reduced diameter intermediate portion 76 of the gripping head which is adapted to abut the top surface of the pivotal jaw member 54 when the thumb screw is advanced into the threaded opening 70 in the fixed jaw member. As will be appreciated by reference to FIGS. 10 and 11, when the thumb screw is completely advanced the intermediate portion 76 of the gripping head forces the trailing segment 58 of the pivotal jaw member into engagement with the fixed jaw member and causes the adjacent side edge 30 of the awning canopy to be gripped between the resilient pads 66 on the fixed and pivotal jaw members. It should also be appreciated that the threaded shaft of the thumb screw, when fully advanced, protrudes through the fixed jaw member so as to project beyond the bottom surface of the fixed jaw member. FIG. 11 illustrates how the retraction of the thumb screw allows the pivotal jaw member to pivot upwardly into an open position thereby releasing the grip on the awning canopy and withdraws the end of the threaded shaft of the thumb screw at least to the bottom surface of the fixed jaw member or even thereabove.

With the clamp 38 released from the awning canopy, the base 40 can be pivoted as described previously into alignment with the rafter arm 28 thereby assuming the non-use position and a threaded hole 78 is provided in the rafter arm in alignment with the thumb screw 56. As best seen in FIG. 8, the thumb screw can be advanced through the threaded opening 70 in the fixed jaw member 52 and threaded into the hole 78 in the rafter arm to secure the base of the clamp in the non-use position.

As will be appreciated, the overall height or depth of the clamp member or in other words its protrusion away from the rafter arm is very shallow and in fact is less than one inch. The rafter arms can, therefore, be moved into their retracted positions of FIGS. 3, 4 and 5 without the clamp engaging the side 24 of the recreational vehicle so that the clamp does not interfere with the movement of the awning into the retracted position.

The clamp 38 can be made of any material having the desired strength such as for example durable plastic, extruded aluminum or the like. It will be appreciated that the clamp remains affixed to the rafter arm thereby alleviating problems inherent in prior art systems for stabilizing awning canopies. The clamp is also easily movable between the use and non-use positions and equally as easily moved between gripping and non-gripping positions relative to the awning canopy.

Although the present invention has been described with a certain degree of particularity, it is understood that the present disclosure has been made by way of example, and changes in detail or structure may be made without departing from the spirit of the invention as defined in the appended claims.

We claim:

1. A clamp for stabilizing the canopy of a retractable awning wherein the retractable awning is mounted on a support surface so as to be moveable between extended and retracted positions, said awning including a canopy having an inner edge operatively connected to said support surface, an outer edge positionable away from said support surface when the awning is extended and a pair of side edges, a pair of rafter arms each having a first end operatively secured to the Supporting surface and an opposite end moveable away from the supporting surface operatively supporting said outer edge of the canopy such that the rafter arms extend in closely adjacent relationship to said side edges of the canopy when the awning is extended, said clamp being mounted upon at least one of said rafter arms and comprising in combination, a base pivotally connected to said rafter arm and movable between a use position and a non-use position, said base including a clip adapted to releasably grip a side edge of said canopy in said use position to substantially immobilize said side edge relative to said rafter arm at the location where said side edge is gripped by said clip.

2. The clamp of claim 1 wherein said base is elongated and extends in parallel relationship to said rafter arm in said non-use position and substantially perpendicular to said rafter arm in said use position.

3. The clamp of claim 2 wherein said clamp further includes a pivot pin adjacent one end of said base, said base being pivotal about said pin and said pivot pin being secured to said rafter arm.

4. The clamp of claim 3 further including releasable connection means on said base spaced from said pivot pin and adapted to be releasably connected to said rafter arm to releasably retain the base in the non-use position.

5. The clamp of claim 3 wherein said clip includes a pair of adjustable jaws and an adjustment controller for selectively allowing the jaws to be alternately opened and closed relative to each other.

6. The clamp of claim 4 wherein said clip includes a pair of adjustable jaws and said connection means is operatively associated with said jaws for selectively allowing the jaws to be alternately opened and closed relative to each other.

7. The clamp of claim 6 wherein said releasable connection means includes a thumb screw adapted to draw said jaws into abutting relationship and also to be selectively connected to said rafter arm.

8. The clamp of claim 7 wherein said jaws include a fixed jaw member and a pivotal jaw member pivoted on said fixed jaw member, said pivotal jaw member having a passage therethrough slidably receiving said thumb screw and said fixed jaw member having a threaded passage therethrough threadably receiving said thumb screw.

9. The clamp of claim 8 wherein said rafter arm includes a threaded hole alignable with said threaded passage in said fixed jaw, when the base of the clamp is positioned in said non-use position, whereby said thumb screw can secure to said rafter arm the clip portion of said base.

10. The clamp of claim 1 wherein the thickness of said clamp is no greater than one inch.

* * * * *